US012238307B2

(12) United States Patent
Choi et al.

(10) Patent No.: US 12,238,307 B2
(45) Date of Patent: *Feb. 25, 2025

(54) DECODED PICTURE BUFFER MANAGEMENT FOR VIDEO CODING

(71) Applicant: TENCENT AMERICA LLC, Palo Alto, CA (US)

(72) Inventors: Byeongdoo Choi, Palo Alto, CA (US); Shan Liu, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,560

(22) Filed: Sep. 9, 2022

(65) Prior Publication Data
US 2023/0013580 A1 Jan. 19, 2023

Related U.S. Application Data

(63) Continuation of application No. 17/204,098, filed on Mar. 17, 2021, now Pat. No. 11,516,486, which is a
(Continued)

(51) Int. Cl.
H04N 19/169 (2014.01)
H04N 19/15 (2014.01)
H04N 19/174 (2014.01)

(52) U.S. Cl.
CPC ........... *H04N 19/188* (2014.11); *H04N 19/15* (2014.11); *H04N 19/174* (2014.11)

(58) Field of Classification Search
CPC .......................... H04N 19/188; H04N 19/174
(Continued)

(56) References Cited

U.S. PATENT DOCUMENTS 9,900,605 B2   2/2018 Ramasubramonian et al.
2014/0086326 A1* 3/2014 Dziecielewski ... H04N 21/4402
                                                375/240.16
(Continued)

FOREIGN PATENT DOCUMENTS

CA   3 132 479 A1   9/2020
CN   108322754 A    7/2018
(Continued)

OTHER PUBLICATIONS

Sjöberg et al., "HEVC High-Level Syntax", HEVC High-Level Syntax Algorithms and Architectures, pp. 13-48, Aug. 23, 2014 (36 pages total).
(Continued)

Primary Examiner — Amir Shahnami
(74) Attorney, Agent, or Firm — Sughrue Mion, PLLC

(57) ABSTRACT

Methods and devices for encoding a video stream are provided, a method includes storing previously decoded pictures of the video stream in a decoded picture buffer, including a plurality of first pictures of a same temporal sub-layer, the plurality of first pictures including at least one sub-layer reference picture for predicting a current picture of the video stream; identifying a network abstract layer (NAL) unit type of a picture of the plurality of first pictures; removing, based on the NAL unit type of the picture identified, the picture from the decoded picture buffer; and encoding the current picture using the decoded picture buffer. The encoding includes: predicting the current picture using one or more of the at least one sub-layer reference picture that is stored within the decoded picture buffer, after removing the picture from the decoded picture buffer.

19 Claims, 8 Drawing Sheets

Related U.S. Application Data continuation of application No. 16/815,710, filed on Mar. 11, 2020, now Pat. No. 10,986,353.

(60) Provisional application No. 62/819,460, filed on Mar. 15, 2019.

(58) Field of Classification Search
USPC .................................................. 375/240.26
See application file for complete search history.

(56) References Cited

U.S. PATENT DOCUMENTS

| | | | |
|---|---|---|---|
| 2015/0016545 A1* | 1/2015 | Ramasubramonian | ................... H04N 19/423 375/240.25 |
| 2015/0103923 A1 | 4/2015 | Ramasubramonian et al. | |
| 2015/0373338 A1 | 12/2015 | Hendry et al. | |
| 2015/0373342 A1 | 12/2015 | Hendry et al. | |
| 2017/0026655 A1 | 1/2017 | Deshpande | |
| 2017/0134742 A1 | 5/2017 | Deshpande | |
| 2018/0270505 A1 | 9/2018 | Samuelsson et al. | |
| 2019/0058895 A1* | 2/2019 | Deshpande | .... H04N 21/234327 |

FOREIGN PATENT DOCUMENTS

| | | |
|---|---|---|
| EP | 2 946 556 B1 | 10/2016 |
| GB | 2534591 A | 8/2016 |
| KR | 10-2008-0066784 A | 7/2008 |
| WO | 2015/137432 A1 | 9/2015 |
| WO | 2015/195942 A1 | 12/2015 |

OTHER PUBLICATIONS

Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC USC 29/WG 11, JCTVC-L1003_v34, 12th Meeting: Geneva, CH, Jan. 14-23, 2013 (310 pages total).

Choi et al., "AHG17: On decoded picture buffer management", Joint Video Experts Team (JVET) of ITU-T SG 16 WP 3 and ISO/IEC JTC 1/SC 29/WG 11, JVET-N0058, 14th Meeting: Geneva, CH, Mar. 19-27, 2019 (5 pages total).

Choi et al., "AHG17: On decoded picture buffer management", Joint Video Experts Team (JVET) of ITU-T SG 16 WP 3 and ISO/IEC JTC 1/SC 29/WG 11, JVET-N0058-v2, 14th Meeting: Geneva, CH, Mar. 19-27, 2019 (5 pages total).

Extended European Search Report dated Dec. 8, 2022 from the European Patent Office in EP Application No. 20773256.1.

Bross, Benjamin et al.,"Versatile Video Coding (Draft 4)",Joint Video Experts Team (JVET) of ITU-T SG 16 WP 3 and ISO/IEC JTC 1/SC 29/WG 11, 13th Meeting: Marrakech, MA, Jan. 9-18, 2019, [JVET-M1001-v6],JVET-M1001(version 6),ITU-T,Mar. 9, 2019,<URL:http://phenix.it-sudparis.eu/jvet/doc_end_user/documents/13_Marrakech/wg11/JVET-M1001-v6.zip>: JVETM1001-v6.docx: pp. 99-101 (6 pages).

Choi, Byeongdoo et al.,"AHG17: On decoded picture buffer management",Joint Video Experts Team (JVET) of ITU-T SG 16 WP 3 and ISO/IEC JTC 1/SC 29/WG 11, 14th Meeting: Geneva, CH, Mar. 19-27, 2019, [JVET-N0058], JVET-N0058 (version 1),ITU-T,Mar. 16, 2019,<URL:http://phenix.it-sudparis.eu/jvet/doc_end_user/documents/14_Geneva/wg11/JVET-N0058-v1.zip>:JVET-N0058.docx: pp. 1-5 (7 pages).

Choi, Byeongdoo et al.,"MV-HEVC/SHVC HLS: On inter-layer dependency signalling",Joint Collaborative Team on Video Coding (JCT-VC) of ITU-T SG 16 WP3 and ISO/IEC JTC 1/SC 29/WG 11, 15th Meeting: Geneva, CH, Oct. 23-Nov. 1, 2013, [JCTVC-O0138r1],JCTVC-O0138 (version 2),ITU-T,Oct. 21, 2013,<URL:http://phenix.it-sudparis.eu/jct/doc_end_user/documents/15_Geneva/wg11/JCTVC-O0138-v2.zip>: JCTVC-O0138r1.doc.doc: pp. 1-7 (9 pages).

International Search Report and Written Opinion in International Application No. PCT/US2020/022264, dated May 28, 2020.

Office Action dated Aug. 22, 2022, issued in Japanese Application No. 2021-540209.

Office Action dated Apr. 25, 2022 in Korean Application No. 10-2021-7026379.

Office Action dated Nov. 24, 2021 in Canadian Application No. 3,132,986.

Series H: Audiovisual and Multimedia Systems Infrastructure of audiovisual services—Coding of moving video,Recommendation ITU-T H.265 (Apr. 2015) High efficiency video coding,ITU-T,Jul. 9, 2015,pp. 12,62-65,110-114,253 (13 pages) <URL:https://www.itu.int/rec/dologin.asp?lang=e&id=T-REC-H.265-201504-S!!PDF-E&type=items>.

* cited by examiner

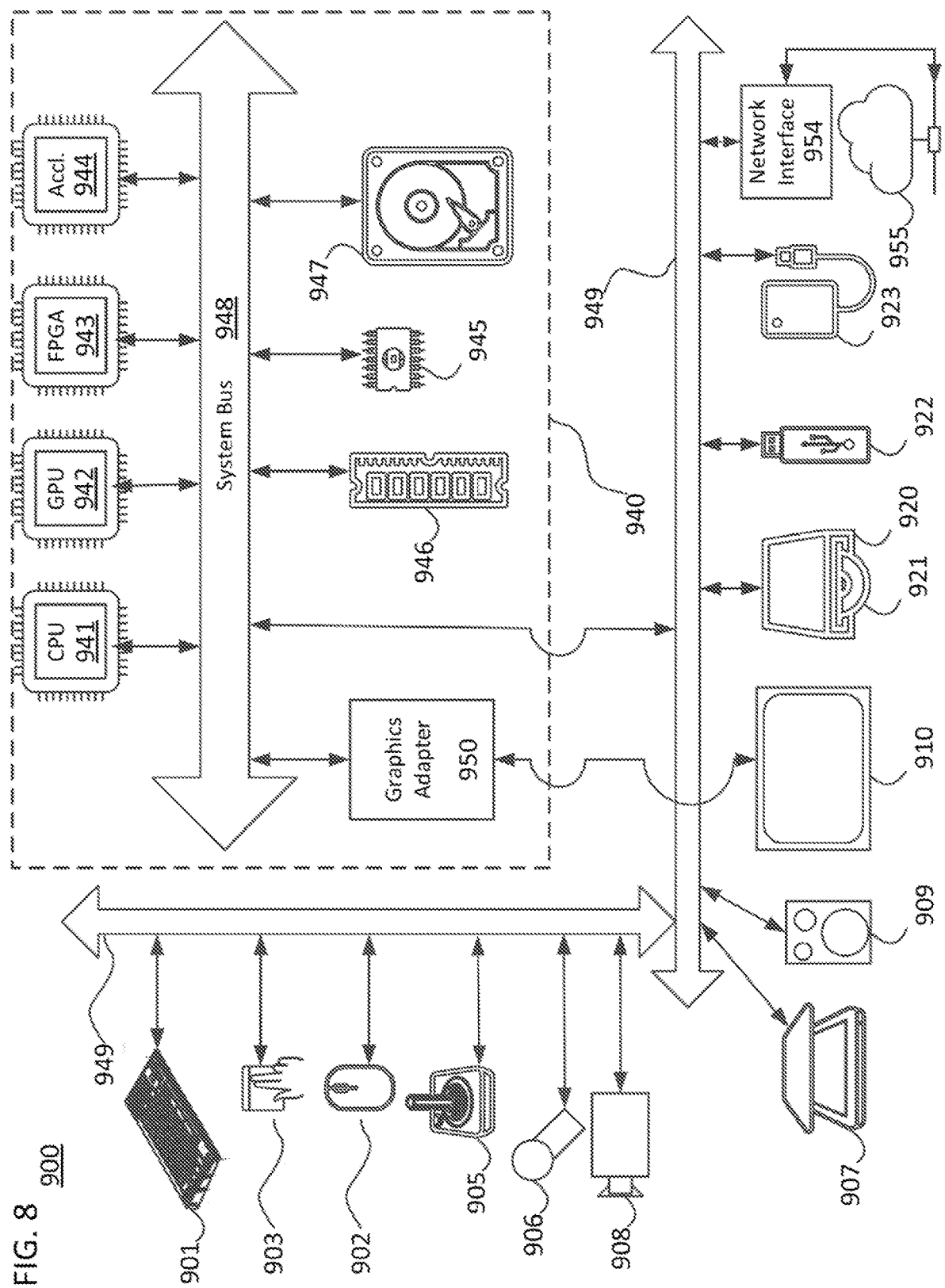

DECODED PICTURE BUFFER MANAGEMENT FOR VIDEO CODING

CROSS-REFERENCE TO RELATED APPLICATION

This application is a continuation of U.S. application Ser. No. 17/204,098, filed on Mar. 17, 2021, which is a continuation of U.S. application Ser. No. 16/815,710, filed on Mar. 11, 2020, now U.S. Pat. No. 10,986,353, patented on Apr. 20, 2021, which claims priority from U.S. Provisional Application No. 62/819,460, filed on Mar. 15, 2019, the disclosures of which are incorporated herein by reference in their entireties.

FIELD

This disclosure is directed to a set of advanced video coding technologies. More specifically, decoded picture buffer management.

BACKGROUND

Systems for decoding include a decoded picture buffer for storing pictures to be used as reference in decoding.

SUMMARY

Some embodiments of the present disclose improve decoded picture buffer management by, for example, accommodating temporal sub-layer adaptation.

In some embodiments, a method is provided. The method includes: storing previously decoded pictures of the video stream in a decoded picture buffer, including a plurality of first pictures of a same temporal sub-layer, the plurality of first pictures including at least one sub-layer reference picture for predicting a current picture of the video stream; identifying a network abstract layer (NAL) unit type of a picture of the plurality of first pictures; removing, based on the NAL unit type of the picture identified, the picture from the decoded picture buffer; and encoding the current picture using the decoded picture buffer. The encoding includes: predicting the current picture using one or more of the at least one sub-layer reference picture that is stored within the decoded picture buffer, after removing the picture from the decoded picture buffer.

In some embodiments, a decoder for decoding a video stream is provided. The decoder includes memory configured to store computer program code; and at least one processor configured to access the computer program code, and operate as instructed by the computer program code, the computer program code including: storing code configured to cause the at least one processor to store previously decoded pictures of the video stream in a picture buffer, including a first plurality of pictures of a same temporal sub-layer, the first plurality of pictures including at least one sub-layer reference picture for predicting a current picture of the video stream; determining code configured to cause the at least one processor to determine whether a picture of the first plurality of pictures is a sublayer non-reference ("SLNR") picture based on an indicator presented in at least one from among a slice header and a picture header; removing code configured to cause the at least one processor to remove, based on the picture being determined as the SLNR picture, the SLNR picture from the picture buffer; and predicting code configured to cause the at least one processor to predict the current picture using one or more of the at least one sub-layer reference picture that is stored within the picture buffer after removing the SLNR picture from the picture buffer.

In an embodiment, the identifying the NAL unit type of the picture includes identifying the NAL unit type of the picture as one that includes: a coded tile group of a non step-wise temporal sub-layer access (STSA) trailing picture, a coded tile group of an STSA picture, a coded tile group of a random access skipped leading (RASL) picture, or a coded tile group of a random access decodable leading (RADL) picture.

In an embodiment, the identifying the NAL unit type includes identifying the NAL unit type of the picture as the one that includes the coded tile group of the non-STSA trailing picture.

In an embodiment, the identifying the NAL unit type includes identifying the NAL unit type of the picture as the one that includes the coded tile group of the STSA picture.

In an embodiment, the identifying the NAL unit type includes identifying the NAL unit type of the picture as the one that includes the coded tile group of the RASL picture.

In an embodiment, the identifying the NAL unit type includes identifying the NAL unit type of the picture as the one that includes the coded tile group of the RADL picture.

In an embodiment, the method further includes: providing an identifier for the picture, based on the identifying the NAL unit type of the picture, wherein the removing includes removing the picture from the decoded picture buffer based on the identifier.

In an embodiment, the method further includes: forming a reference picture list including an entry for each of the plurality of first pictures, wherein the providing the identifier includes providing the identifier in the entry of the reference picture list that corresponds to the picture.

In an embodiment, the previously decoded pictures stored in the decoded picture buffer includes a second picture that is a reference picture, and the method further includes: determining whether a value of the temporal sub-layer of the second picture is greater than a predetermined value; and removing the second picture from the decoded picture buffer based on determining that the value of the temporal sub-layer of the second picture is greater than the predetermined value.

In an embodiment, the method further includes: providing an identifier for the second picture, based on determining that the value of the temporal sub-layer of the second picture is greater than the predetermined value, wherein the removing the second picture includes removing the second picture from the decoded picture buffer based on the identifier.

In some embodiments, an encoder for encoding a video stream is provided. The encoder includes: memory configured to store computer program code; and at least one processor configured to access the computer program code, and operate as instructed by the computer program code. The computer program code including: storing code configured to cause the at least one processor to store previously decoded pictures of the video stream in a decoded picture buffer, including a plurality of first pictures of a same temporal sub-layer, the plurality of first pictures including at least one sub-layer reference picture for predicting a current picture of the video stream; identifying code configured to cause the at least one processor to identify a network abstract layer (NAL) unit type of a picture of the plurality of first pictures; removing code configured to cause the at least one processor to remove, based on the NAL unit type of the picture identified, the picture from the decoded picture buffer; and encoding code configured to cause the at least one processor to encode the current picture using the decoded picture buffer, the encoding code including predicting code configured to cause the at least one processor to predict the current picture using one or more of the at least one sub-layer reference picture that is stored within the decoded picture buffer, after removing the picture from the decoded picture buffer.

In an embodiment, the identifying code is configured to cause the at least one processor to identify the NAL unit type of the picture as one that includes: a coded tile group of a non step-wise temporal sub-layer access (STSA) trailing picture, a coded tile group of an STSA picture, a coded tile group of a random access skipped leading (RASL) picture, or a coded tile group of a random access decodable leading (RADL) picture.

In an embodiment, the identifying code is configured to cause the at least one processor to identify the NAL unit type of the picture as the one that includes the coded tile group of the non-STSA trailing picture.

In an embodiment, the identifying code is configured to cause the at least one processor to identify the NAL unit type of the picture as the one that includes the coded tile group of the STSA picture.

In an embodiment, the identifying code is configured to cause the at least one processor to identify the NAL unit type of the picture as the one that includes the coded tile group of the RASL picture.

In an embodiment, the identifying code is configured to cause the at least one processor to identify the NAL unit type of the picture as the one that includes the coded tile group of the RADL picture.

In an embodiment, the computer program code further includes providing code configured to cause the at least one processor to provide an identifier for the picture, based on identifying the NAL unit type of the picture, and the removing code is configured to cause the at least one processor to remove the picture from the decoded picture buffer based on the identifier.

In an embodiment, the computer program code further includes forming code configured to cause the at least one processor to form a reference picture list including an entry for each of the plurality of first pictures, and the providing code is configured to cause the at least one processor to provide the identifier in the entry of the reference picture list that corresponds to the picture.

In an embodiment, the previously decoded pictures stored in the decoded picture buffer includes a second picture that is a reference picture, the computer program code further includes determining code that is configured to cause the at least one processor to determine whether a value of the temporal sub-layer of the second picture is greater than a predetermined value, and the removing code is configured to cause the at least one processor to remove the second picture from the decoded picture buffer based on determining that the value of the temporal sub-layer of the second picture is greater than the predetermined value.

In some embodiments, a non-transitory computer-readable medium storing computer instructions is provided. The computer instructions, when executed by at least one processor, cause the at least one processor to: store previously decoded pictures of a video stream in a decoded picture buffer, including a plurality of first pictures of a same temporal sub-layer, the plurality of first pictures including at least one sub-layer reference picture for predicting a current picture of the video stream; identify a network abstract layer (NAL) unit type of a picture of the plurality of first pictures; remove, based on the NAL unit type of the picture identified, the picture from the decoded picture buffer; and encode the current picture using the decoded picture buffer by predicting the current picture using one or more of the at least one sub-layer reference picture that is stored within the decoded picture buffer, after removing the picture from the decoded picture buffer.

BRIEF DESCRIPTION OF THE DRAWINGS

Further features, the nature, and various advantages of the disclosed subject matter will be more apparent from the following detailed description and the accompanying drawings in which:

FIG. 8 is a diagram of a computer system suitable for implementing embodiments.

DETAILED DESCRIPTION

Figure 1:
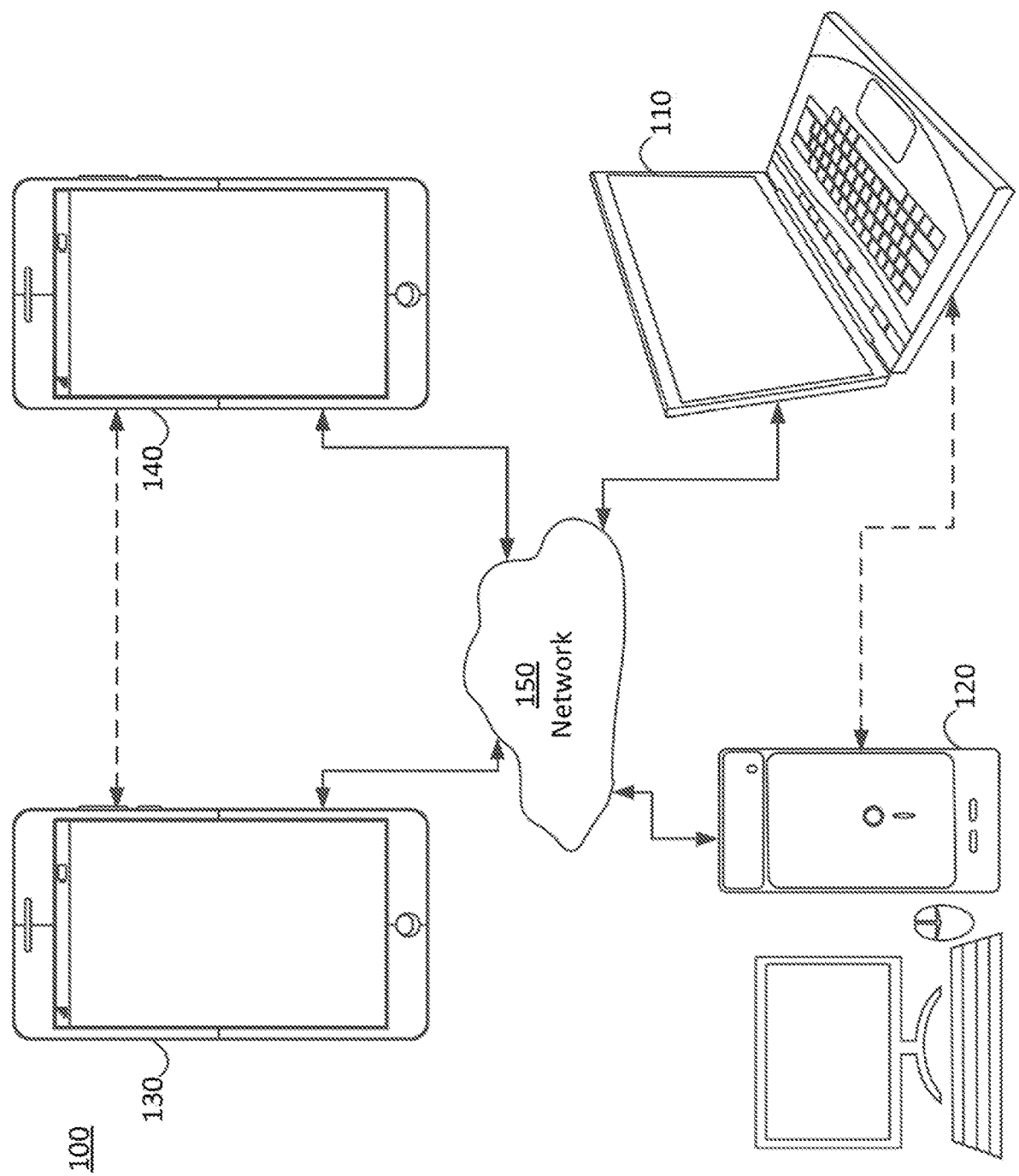
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
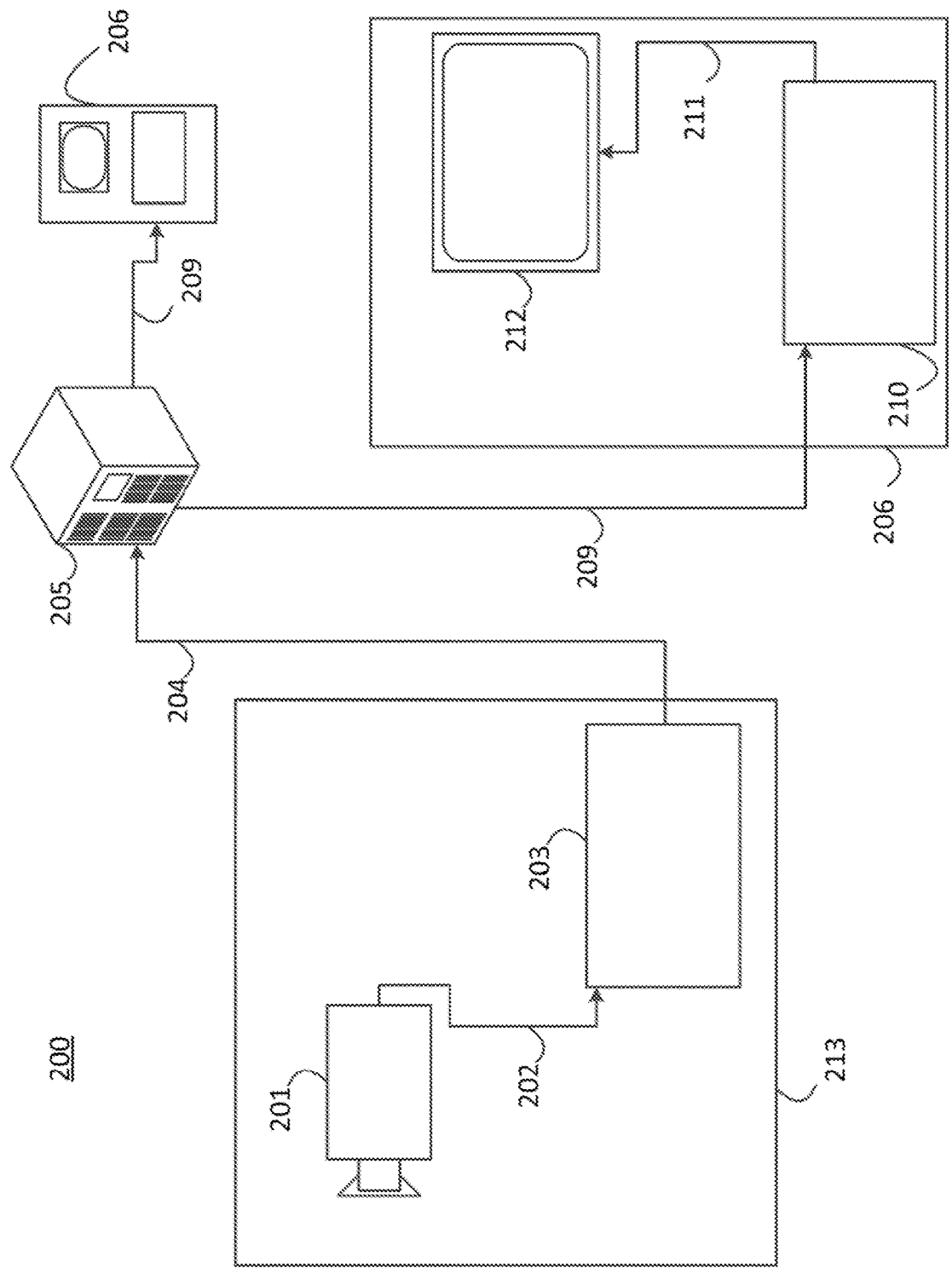
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, an uncompressed video sample stream 202. The video source 201 may be, for example, a digital camera. The sample stream 202, depicted as a bold line to emphasize a high data volume when compared to encoded video bitstreams, can be processed by the encoder 203 coupled to the camera 201. The encoder 203 can include hardware, software, or a combination thereof to enable or implement aspects of the disclosed subject matter as described in more detail below. The encoder 203 may also generate an encoded video bitstream 204. The encoded video bitstream 204, depicted as a thin line to emphasize a lower data volume when compared to the uncompressed video sample stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
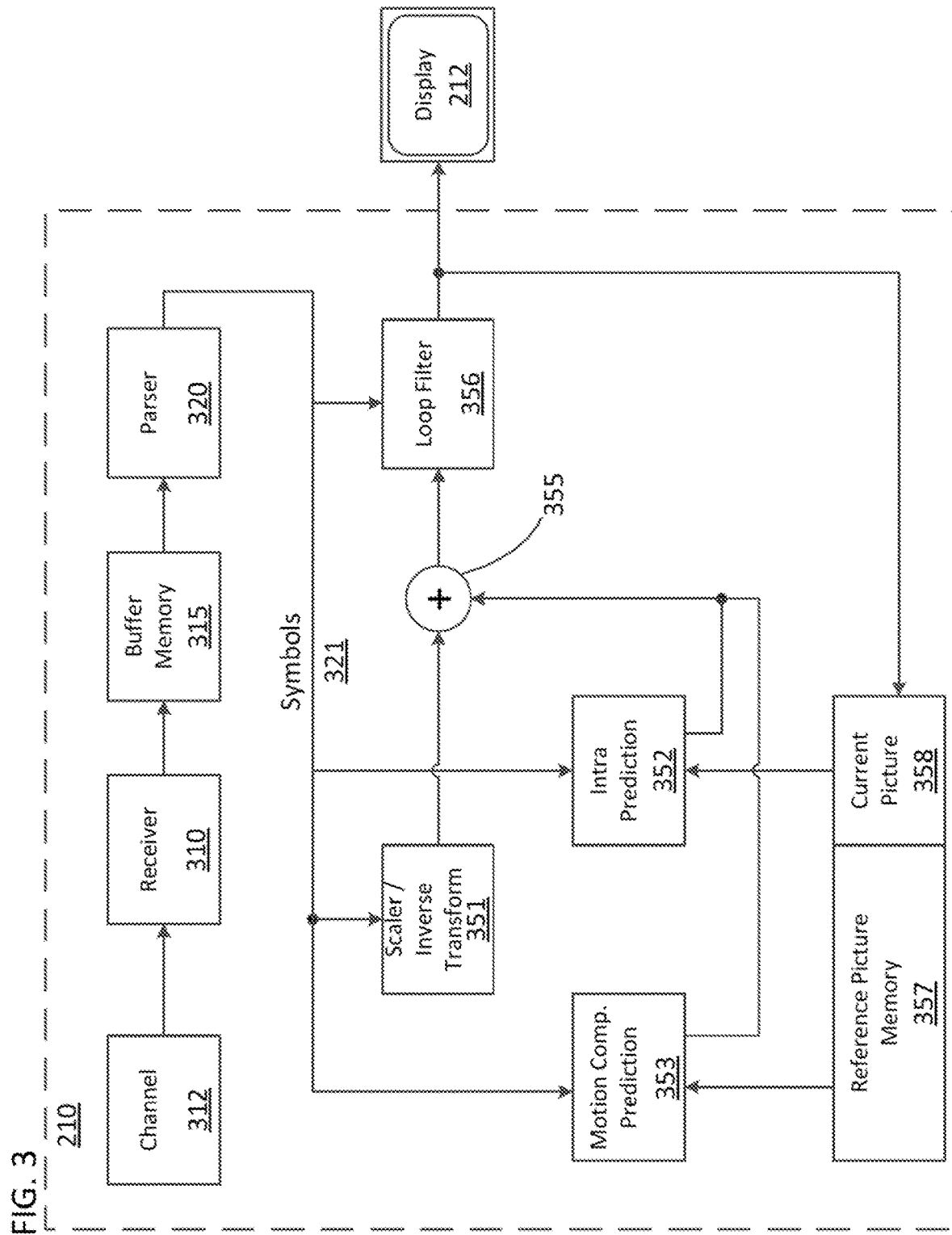
FIG. 3 is a schematic illustration of a simplified block diagram of a video decoder and a display in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra prediction unit 352, a Motion Compensation Prediction unit 353, an aggregator 355, a loop filter unit 356, reference picture memory 357, and current picture memory 358. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer 315 may not be used, or can be small. For use on best effort packet networks such as the Internet, the buffer 315 may be required, can be comparatively large, and can be of adaptive size.

The video decoder 210 may include the parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units described below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks comprising sample values that can be input into the aggregator 355.

In some cases, the output samples of the scaler/inverse transform 351 can pertain to an intra coded block; that is: a block that is not using predictive information from previously reconstructed pictures, but can use predictive information from previously reconstructed parts of the current picture. Such predictive information can be provided by the intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access the reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from where the Motion Compensation Prediction unit 353 fetches prediction samples, can be controlled by motion vectors. The motion vectors may be available to the Motion Compensation Prediction unit 353 in the form of symbols 321 that can have, for example x, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture stored in the current picture memory 358 can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
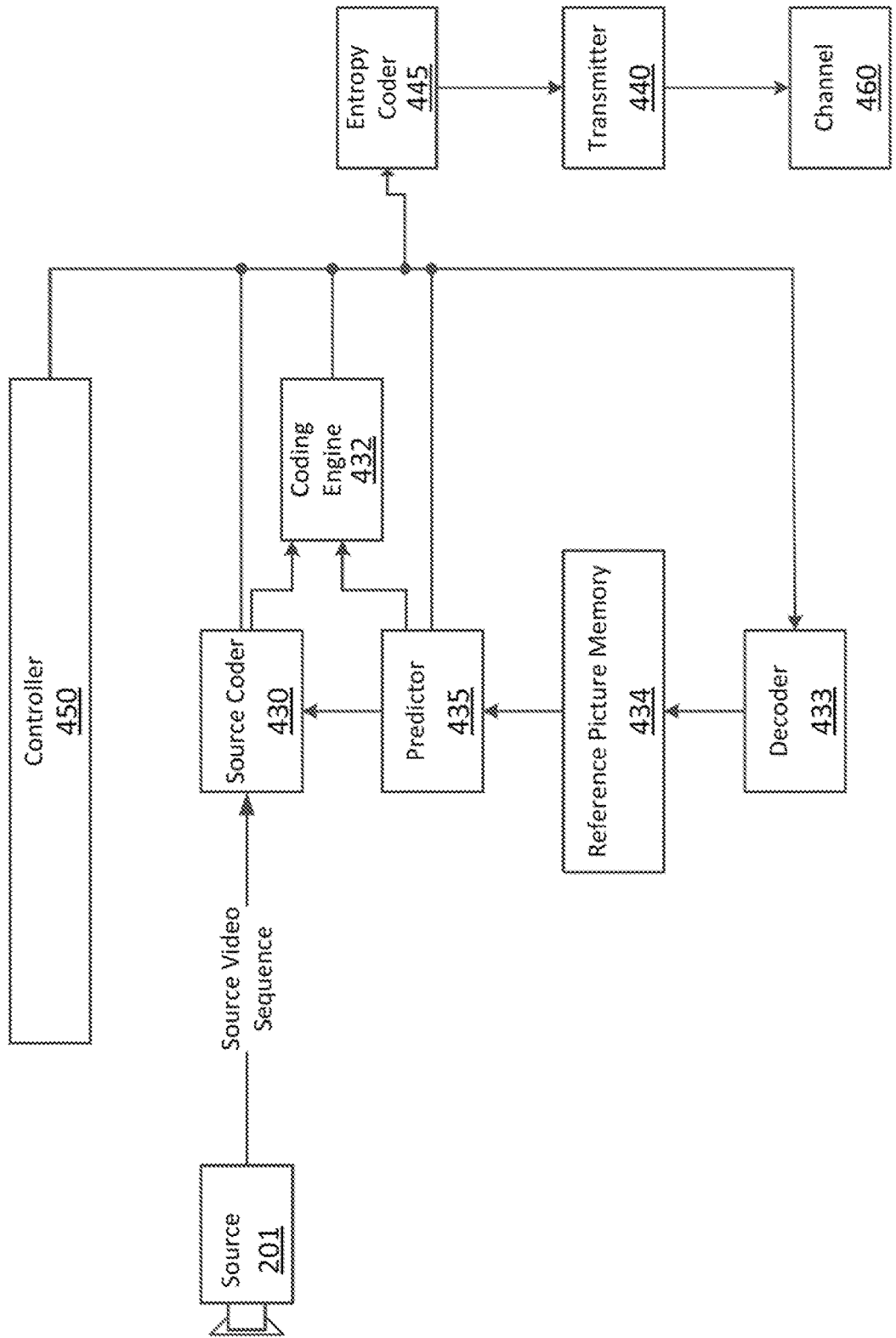
FIG. 4 is a schematic illustration of a simplified block diagram of a video encoder and a video source in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 434, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: x bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 203 may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder 203 may code and compress the pictures of the source video sequence into a coded video sequence 443 in real time or under any other time constraints as required by the application. Enforcing appropriate coding speed may be one function of the controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder (203) optimized for a certain system design.

Some video encoders operate in what a person skilled in the are readily recognizes as a "coding loop". As a simplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create, when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be substantially the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer 315, and parser 320 may not be fully implemented in the local decoder 433.

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local video decoder 433 may decode coded video data of frames that may be designated as reference frames, based on symbols created by the source coder 430. Operations of the coding engine 432 may advantageously be lossy processes. When the coded video data is decoded at a video decoder (not shown in FIG. 4), the reconstructed video sequence typically may be a replica of the source video sequence with some errors. The local video decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the video coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the video coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 203 may perform coding operations according to a predetermined video coding technology or standard, such as ITU-T Rec. H.265. In its operation, the video coder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The video coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The encoders and decoders of the present disclosure may implement the decoded picture buffer management of the present disclosure with respect to a decoded picture buffer (DPB) such as, for example, reference picture memory 357 and reference picture memory 434.

The decoded picture buffer may store decoded pictures to be available for reference to reconstruct subsequent pictures in a decoding process. For example, the pictures stored in the decoded picture buffer may be available to be used as references in a prediction process of one or more subsequent pictures.

Encoder and decoders of the present disclosure may construct and/or use one or more reference picture lists (e.g. syntax element "RefPicList[i]") that each list pictures stored in the decoded picture buffer. For example, each index in a reference picture list may correspond to a respective picture in the decoded picture buffer. A reference picture list may refer to, for example, a list of reference pictures that may be used for inter prediction.

Some aspects of the decoded picture buffer management of the present disclosure are described below.

Some embodiments of the present disclosure improve decoded picture buffer management by accommodating temporal sub-layer adaptation. The term "sub-layer" may refer to a temporal scalable layer of a temporal scalable bitstream that includes VCL NAL units with a particular value of the TemporalId variable and the associated non-VCL NAL units.

For example, in an embodiment, the network abstraction layer (NAL) units "TRAIL_NUT", "STSA_NUT", "RASL_NUT" and "RADL_NUT" are re-specified as ("TRAIL_N", "TRAIL_R"), ("STSA_N", "STSA _R"), ("RASL_N, RASL_R"), and ("RADL_N, RASL_R"), respectively, to indicate whether pictures in the same temporal sub-layer are referenced pictures or non-referenced pictures. Non-referenced pictures having a temporal identifier equal to that of the current picture to be decoded may be included in the RefPicList[i].

In an embodiment, "sps_max_dec_pic_buffering_minus1" is signaled for each highest temporal identifier in a sequence parameter set ("SPS").

In an embodiment, a list of unused reference pictures for each highest temporal identifier is signaled in a tile group header.

In an embodiment, all reference pictures with a temporal identifier (e.g., syntax element "TemporalId") greater than a specified highest temporal identifier (e.g., syntax element "HighestTid") are marked as "unused for reference", when the value of the specified highest temporal identifier is not equal to "sps_max_sub_layers_minus1".

According to some embodiments of the present disclosure, NAL units that are not used for predicting and reconstructing other NAL units following in the same temporal sub-layer may or may not be discarded from the decoded picture buffer, depending on the targeted bitrate or the available bitrate of the network.

Figure 5:
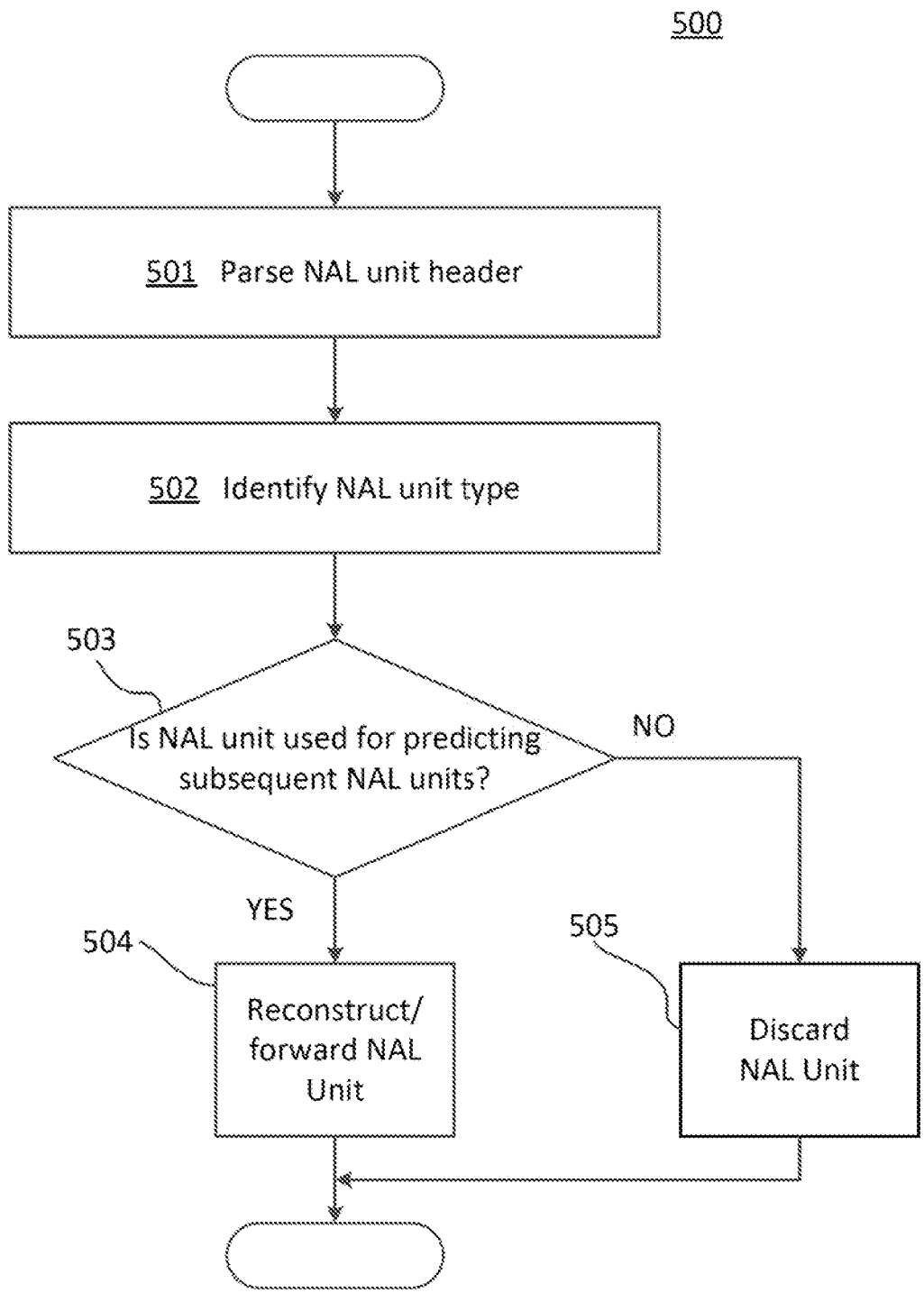
FIG. 5 is a flow diagram illustrating a process performed by an embodiment.

For example, FIG. 5 is a flow diagram illustrating how encoders and decoders of the present disclosure may handle the corresponding NAL units by parsing and interpreting NAL unit types. As illustrated in FIG. 5, a decoder (or encoder) may perform a process 500. The process 500 may include parsing an NAL unit header of an NAL unit (501) and identifying the NAL unit type of the present NAL unit (502). Following, the decoder (or encoder) may determine whether the present NAL unit is used for predicting and reconstructing subsequent NAL units in the same temporal sub-layer (503). Based on the determination, the decoder (or encoder) may reconstruct/forward a subsequent NAL unit using the present NAL unit (504) or, alternatively, discard the present NAL unit from the decoded picture buffer (505) without using the NAL unit for predicting and reconstructing the subsequent NAL unit. For example, if determined that the present NAL unit is used for predicting and reconstructing subsequent NAL units in the same temporal sub-layer, the decoder (or encoder) may reconstruct/forward a subsequent NAL unit using the present NAL unit (504) that is stored in the decoded picture buffer. If the NAL is not used for predicting and reconstructing the subsequent NAL unit, the decoder (or encoder) may discard the present NAL unit from the decoded picture buffer (505) without using the NAL unit for predicting and reconstructing the subsequent NAL unit. Predicting and reconstructing the subsequent NAL unit may refer to decoding, using the decoded picture buffer, a current picture by predicting and reconstructing the current picture.

Embodiments of the present disclosure may be used separately or combined in any order. Further, each of the methods, encoders, and decoders of the present disclosure may be implemented by processing circuitry (e.g., one or more processors or one or more integrated circuits). In one example, one or more processors execute a program that is stored in a non-transitory computer-readable medium to perform the functions of the methods, encoders, and decoders described in the present disclosure.

As described above, the NAL unit types "TRAIL_NUT", "STSA_NUT", "RASL_NUT" and "RADL_NUT" are split and defined as ("TRAIL_N", "TRAIL_R"), ("STSA_N", "STSA_R"), ("RASL_N", "RASL_R") and ("RADL_N", "RASL_R") to indicate non-referenced pictures in the same sub-layer. Accordingly, encoder and decoders of the present disclosure may use, for example, the NAL units described in Table 1 below.

TABLE 1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded tile group of a non- STSA trailing picture | VCL |
| 1 | TRAIL_R | tile_group_layer_rbsp( ) | |
| 2 | STSA_N | Coded tile group of an STSA picture | VCL |
| 3 | STSA_R | tile_group_layer_rbsp( ) | |
| 4 | RASL_N | Coded tile group of a RASL picture | VCL |
| 5 | RASL_R | tile_group_layer_rbsp( ) | |
| 6 | RADL_N | Coded tile group of a RADL picture | VCL |
| 7 | RADL_R | tile_group_layer_rbsp( ) | |
| 8 | IDR_W_RADL | Coded tile group of an IDR picture | VCL |
| 9 | IDR_N_LP | tile_group_layer_rbsp( ) | |

Pictures of a sub-layer may have one of the above NAL unit types. If a picture has a NAL unit type (e.g., syntax element "nal_unit_type") equal to "TRAIL_N", "TSA_N", "STSA_N", "RADL_N", or "RASL_N", the picture is a sub-layer non-reference (SLNR) picture. Otherwise, the picture is a sub-layer reference picture. An SLNR picture may be a picture that contains samples that cannot be used for inter prediction in the decoding process of subsequent pictures of the same sub-layer in decoding order. A sub-layer reference picture may be a picture that contains samples that may be used for inter prediction in the decoding process of subsequent pictures of the same sub-layer in decoding order. A sub-layer reference picture may also be used for inter prediction in the decoding process of subsequent pictures of higher sub-layers in decoding order.

By providing NAL units (such as, for example, VCL NAL units) that indicate non-referenced pictures, unnecessary NAL units may be discarded for bit-rate adaptation. Non-referenced pictures having a temporal ID (indicating the temporal sub layer in which the picture belongs) equal to that of the current picture may be included in the RefPicList[i]. In this regard, in an embodiment, the non-referenced pictures may be marked as "unused reference picture" and can be promptly removed from the decoded picture buffer.

For example, in an embodiment, the decoder (or encoder) may determine whether a picture is an SLNR picture based on the NAL unit associated with the picture and, if the picture is an SLNR picture, mark the picture as "unused reference picture". The picture, which may be stored in the decoded picture buffer, may be marked by entering an identifier in the entry for the picture in the reference picture list, the identifier being for example, "no reference picture" or "unused reference picture". The decoder (or encoder) may perform such aspects as a part of step 503 of process 500, as illustrated in FIG. 5. Following, the decoder (or encoder) may remove the picture from the decoded picture buffer based on the picture being marked. The decoder (or encoder) may perform such aspect as a part of step 505 of process 500, as illustrated in FIG. 5.

In an embodiment, the reference picture lists "RefPicList[0]" and "RefPicList[1]" may be constructed as follows:

```
for( i = 0; i < 2; i++ ) {
    for( j = 0, k = 0, pocBase = PicOrderCntVal; j < num_ref_entries[ i ][ RplsIdx[ i ] ];
j++) {
        if( st_ref_pic_flag[ i ][ RplsIdx[ i ] ][ j ] ) {
            RefPicPocList[ i ][ j ] = pocBase - DeltaPocSt[ i ][ RplsIdx[ i ] ][ j ]
            if( there is a reference picture picA in the DPB with PicOrderCntVal equal to
RefPicPocList[ i ][ j ]
            && the reference picA is not an SLNR picture with TemporalId equal to that
of the current picture)
                RefPicList[ i ][ j ] = picA
            else
                RefPicList[ i ][ j ] = "no reference
picture"    (8-5)
            pocBase = RefPicPocList[ i ][ j ]
        } else {
            if( !delta_poc_msb_cycle_lt[ i ][ k ] ) {
                if( there is a reference picA in the DPB with
PicOrderCntVal & ( MaxPicOrderCntLsb - 1 )
                    equal to poc_lsb_lt[ i ][ RplsIdx[ i ] ][ j ]
                    && the reference picA is not an SLNR picture with TemporalId equal to
that of the current picture)
                    RefPicList[ i ][ j ] = picA
                else
                    RefPicList[ i ][ j ] = "no reference picture"
            } else {
                if( there is a reference picA in the DPB with PicOrderCntVal equal to
                    FullPocLt[ i ][ RplsIdx[ i ] ][ j ]
                    && the reference picA is not an SLNR picture with TemporalId equal to
that of the current picture )
                    RefPicList[ i ][ j ] = picA
                else
                    RefPicList[ i ][ j ] = "no reference picture"
            }
            k++
```

```
          }
        }
      }
}
```

In an embodiment, constraints may apply for bitstream conformance. For example, the encoder or decoder may be constrained such that there is no active entry in RefPicList [0] or RefPicList[1] for which one or more of the following are true: (1) The entry is equal to "no reference picture". (2) The entry is an SLNR picture and has "TemporalId" equal to that of the current picture.

As described above, in an embodiment, the syntax element "sps_max_dec_pic_buffering_minus1" may be signaled for each highest temporal identifier (e.g. syntax element "HighestTid") in SPS.

The value of the variable "HighestTid" can be determined by an external means, if an external means is available. Otherwise, "HighestTid" may be set equal to the syntax element "sps_max_sub_layers_minus1". Then, the decoder can estimate the maximum required size of the decoded picture buffer for the given "HighestTid" value.

In the embodiment, the SPS may include the following example syntax shown in Table 2.

TABLE 2

| | |
|---|---|
| seq_parameter_set_rbsp( ) { | |
| ... | |
|   for( i = 0; i <= sps_max_sub_layers_minus1; i++ ) { | |
|     sps_max_dec_pic_buffering_minus1[ i ] | ue(v) |
|   } | |
| ... | |
| } | |

"sps_max_dec_pic_buffering_minus1[i]" plus 1 specifies the maximum required size of the decoded picture buffer for the coded video sequence ("CVS") in units of picture storage buffers when "HighestTid" is equal to i. The value of "sps_max_dec_pic_buffering_minus1 [i]" may be in the range of 0 to "MaxDpbSize"−1, inclusive, where "MaxDpbSize" is specified somewhere else.

As described above, in an embodiment, the list of unused reference pictures for each highest temporal id may be signaled in a tile group header.

Depending on the value of "HighestTid", some reference pictures of each temporal sub-layer may not be used as reference for the subsequent pictures. In an embodiment, unused reference pictures corresponding to each "HighestTid" value in the tile group header may be explicitly signaled. By explicitly signaling unused reference pictures corresponding to each "HighestTid" value in the tile group header, the unused decoded reference pictures can be promptly removed from the DPB.

In the embodiment, the SPS may include the following example syntax shown in Table 3.

TABLE 3

| | Descriptor |
|---|---|
| seq_parameter_set_rbsp( ) { | |
|   ... | |
|   unused_ref_pic_signaling_enabled_flag | u(1) |
|   ... | |
| } | |

"unused_ref_pic_signaling_enabled_flag" equal to 0 specifies that "num_unused_ref_pic" and "delta_poc_unused_ref_pic[i]" are not present in the tile group header, and the removal timing of a decoded picture from the DPB is implicitly determined. "unused_ref_pic_signaling_enabled_flag" equal to 1 specifies that "num_unused_ref_pic" and "delta_poc_unused_ref_pic[i]" are present in tile group header, and the removal timing of a decoded picture from the DPB is explicitly determined by parsing "delta_poc_unused_ref_pic[i]".

In the embodiment, the tile group header may include the following example syntax shown in Table 4.

TABLE 4

| | Descriptor |
|---|---|
| tile_group_header( ) { | |
|   ... | |
|   if(unused_ref_pic_signaling_enabled_flag) { | |
|     num_unused_ref_pic | ue(v) |
|     for( I = 0; i < num_unused_ref_pic; i++) { | |
|       delta_poc_unused_ref_pic [ i ] | ue(v) |
|     } | |
|   } | |
|   ... | |
| } | |

"num_unused_ref_pic" specifies the number of unused reference picture entries. If not present, the value of this field may be set equal to 0.

"delta_poc_unused_ref_pic [i]" specifies the absolute difference between the picture order count values of the current picture and the unused decoded picture referred to by the i-th entry. The value of "delta_poc_unused_ref_pic [i]" may be in the range of 0 to $2^{15}-1$, inclusive.

If "unused ref_pic_signaling_enabled_flag" is equal to 1, the following applies:

```
for( i = 0; i < num_unused_ref_pic[ HighestTid ]; i++ )
    if( there is a reference picture picX in the DPB
        with PicOrderCntVal equal to (the current picture PicOrderCntVal
        − delta_poc_unused_ref_pic [ HighestTid ][ i ])
        picX is marked as "unused for reference."
```

In an embodiment, the decoder (or encoder) may determine whether a picture is to be marked as an "unused reference picture" based on the above determination. The decoder (or encoder) may perform such aspects as a part of step 503 of process 500, that is illustrated in FIG. 5. Following, the decoder (or encoder) may remove the picture from the decoded picture buffer based on the picture being marked. The decoder (or encoder) may perform such aspect as a part of step 505 of process 500, that is illustrated in FIG. 5.

According to an aspect of an embodiment, all reference pictures with "TemporalId" greater than HighestTid may be marked as "unused for reference" when the value of "HighestTid" is not equal to "sps_max_sub_layers_minus1".

The "HighestTid" value can be instantly changed by an external means. The sub-bitstream extraction process may be applied with the "HighestTid" as an input.

For example, the process may be invoked once per picture, after decoding of a tile group header and the decoding process for reference picture list construction for the tile group, but prior to the decoding of the tile group data. The process may result in one or more reference pictures in the DPB being marked as "unused for reference" or "used for long-term reference".

In an embodiment, a decoded picture in the DPB can be marked as "unused for reference", "used for short-term reference", or "used for long-term reference", but only one among these three at any given moment during the operation of the decoding process. Assigning one of these markings to a picture may implicitly remove another of these markings when applicable. When a picture is referred to as being marked as "used for reference", this collectively refers to the picture being marked as "used for short-term reference" or "used for long-term reference" (but not both).

A decoded picture in the DPB may be identified (e.g. indexed) differently or stored differently within the DPB based on its marking. For example, short term reference pictures ("STRPs") may be identified by their "PicOrderCntVal" values. Long term reference pictures ("LTRPs") may be identified by the Log 2(MaxLtPicOrderCntLsb) LSBs of their "PicOrderCntVal" values.

If the current picture is an IRAP picture with "NoRaslOutputFlag" equal to 1, all reference pictures currently in the DPB (if any) are marked as "unused for reference". "NoRaslOutputFlag" equal to 1 may indicate that there is no output of RASL pictures by the decoder.

All reference pictures with "TemporalId" greater than "HighestTid" are marked as "unused for reference", when the value of "HighestTid" is not equal to "sps_max_sub_layers_minus1".

Figure 6:
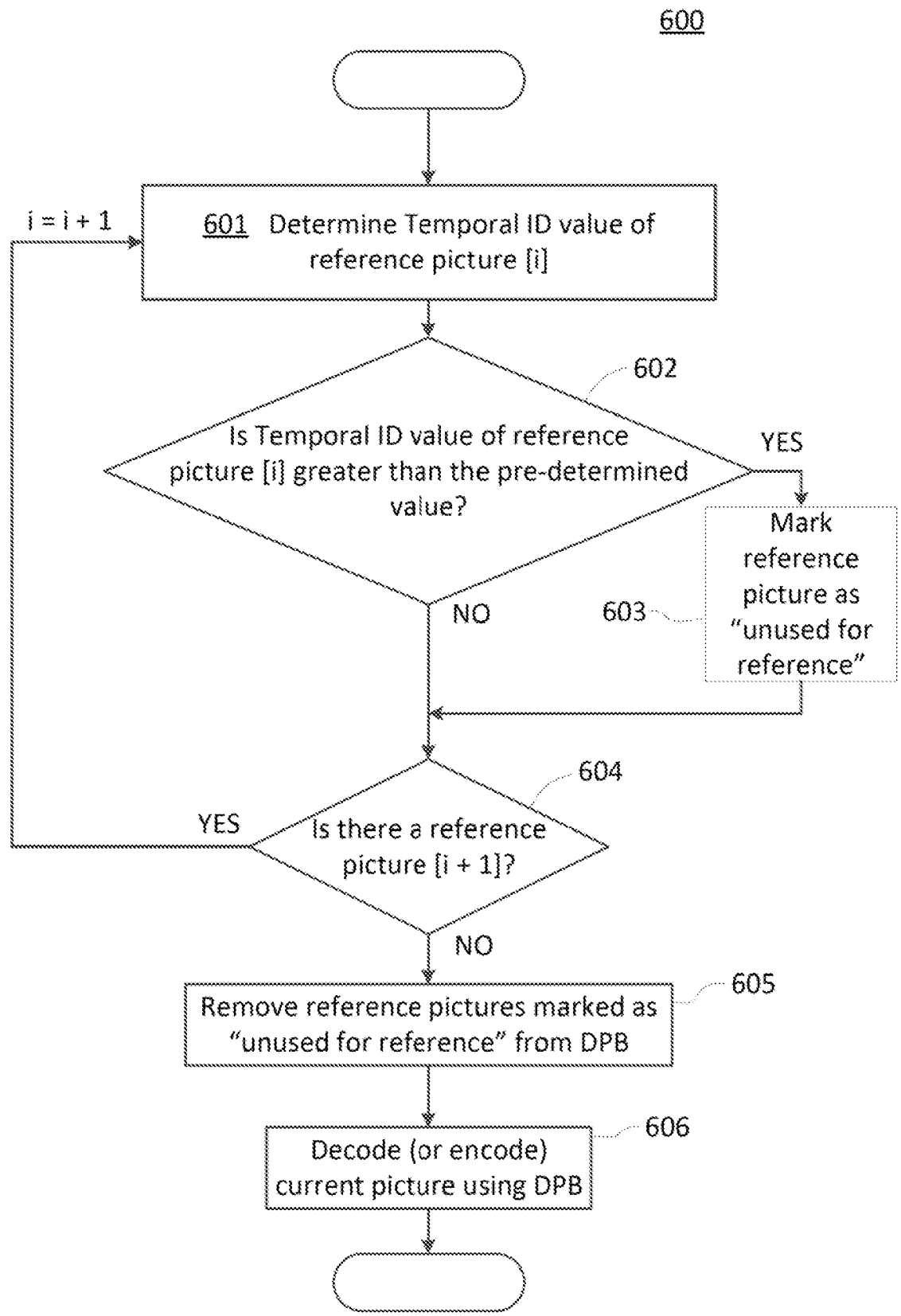
FIG. 6 is a flow diagram illustrating a process performed by an embodiment.

As an example, with reference to FIG. 6, decoders and encoders of the present disclosure can perform process 600. Process 600 can be performed based on determining that the value of "HighestTid" is not equal to "sps_max_sub_layers_minus1". As illustrated in FIG. 6, a decoder (or encoder) may determine a temporal ID value of a reference picture (601). For example, a first reference picture listed in the DPB or a reference picture list. Following, the decoder (or encoder) may compare the temporal ID value of the reference picture to a predetermined value (e.g. value of "HighestTid") (602). If the temporal ID value is greater than the pre-determined value, the decoder (or encoder) may mark the reference picture as "unused for reference" (603). In an embodiment, the decoder (or encoder) may provide the mark in the DPB or a reference picture list.

Regardless of whether the temporal ID value is greater or not greater than the pre-determined value, the decoder (or encoder) may then determine whether there is another reference picture in the DPB (or the reference picture list) that has not had its temporal ID value compared to the pre-determined value in step 602 (604). If the decoder (or encoder) determines that there is another reference picture in the DPB (or the reference picture list) that has not had its temporal ID value compared to the pre-determined value in step 602, the decoder (or encoder) may repeat steps 601-604 for all reference pictures in the DPB (or the reference picture list). Once the decoder (or encoder) determines that all reference pictures in the DPB (or the reference picture list) has had their respective temporal ID value compared to the pre-determined value in step 602, the decoder (or encoder) may remove the reference pictures marked as "unused for reference" from the DPB (605). The decoder (or encoder) may decode the current picture using the DPB with any number of pictures removed from the DPB (606).

In embodiments, decoders (and encoders) may also perform other functions for decoding a current picture using the DPB. For example, decoders (and encoders) can alternatively or additionally apply the following: (1) For each LTRP entry in RefPicList[0] or RefPicList[1], when the referred picture is an STRP, the decoder (or encoder) may mark the picture as "used for long-term reference". (2) The decoder (or encoder) may mark each reference picture in the DPB that is not referred to by any entry in RefPicList[0] or RefPicList[1] as "unused for reference".

In an embodiment, the decoder (or encoder) may remove all reference pictures in the DPB that are marked as "unused for reference" before decoding a current picture using the DPB, or keep such reference pictures in the DPB and ignore the reference pictures when using the DPB to decode the current picture.

In embodiments, a device 800 may comprise memory storing computer program code that, when performed by at least one processor, may cause an at least one processor to perform the functions of the decoders and encoders described above.

Figure 7:
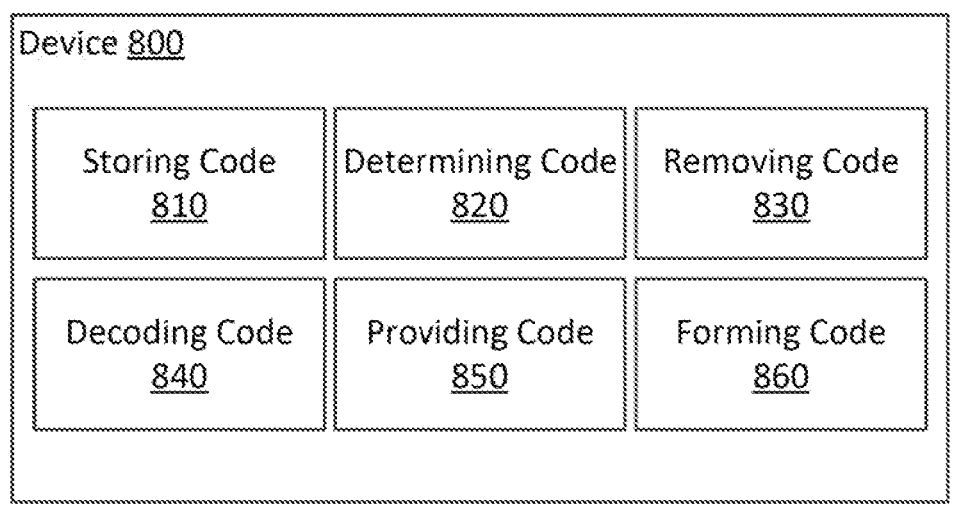
FIG. 7 is a diagram illustrating a device of an embodiment.

For example, with reference to FIG. 7, the computer program code of the device 800 may comprise storing code 810, determining code 820, removing code 830, and decoding code 840.

The storing code 810 may be configured to cause the at least one processor to store previously decoded pictures of the video stream in a decoded picture buffer, including a plurality of first pictures of a same temporal sub-layer, the plurality of first pictures including at least one sub-layer reference picture for predicting a current picture of the video stream.

The determining code 820 may be configured to cause the at least one processor to make determinations in accordance with one or more of the techniques described above. For example, the determining code 820 may be configured to cause the at least one processor to determine whether a picture of the plurality of first pictures is a sublayer non-reference ("SLNR") picture. Alternatively or additionally, the determining code 820 may be configured to cause the at least one processor to identify the network abstract layer (NAL) unit type of the picture, and determine whether the picture is the SLNR picture based on the NAL unit type identified. Alternatively or additionally, the determining code 820 may be configured to cause the at least one processor to determine whether a value of a temporal sub-layer of a picture is greater than a predetermined value (e.g. value of "HighestTid"). Alternatively or additionally, the determining code 820 may be configured to cause the at least one processor to compare a predetermined value (e.g. value of "HighestTid") to a value corresponding to a highest temporal sub-layer identification number. Alternatively or additionally, the determining code 820 may be configured to cause the at least one processor to determine whether the value of the temporal sub-layer of a picture(s) is greater than a predetermined value (e.g. value of "HighestTid") when the predetermined value is determined to not be equal to a value corresponding to the highest temporal sub-layer identification number. Alternatively or additionally, the determining code 820 may be configured to cause the at least one processor to determine whether a current picture is an intra random access point (IRAP) picture, and determine whether a flag indicates that there is no output of a random access skipped leading ("RASL") picture.

The removing code 830 may be configured to cause the at least one processor to remove one or more pictures from the decoded picture buffer in accordance with one or more of the techniques described above. For example, the removing code 830 may be configured to cause the at least one processor to remove, based on the picture being determined as the SLNR picture, the SLNR picture from the decoded picture buffer. Alternatively or additionally, the removing code 830 may be configured to cause the at least one processor to remove a picture(s) from the decoded picture buffer based on determining that the value of the temporal sub-layer of the picture(s) is greater than a predetermined value (e.g. value of "HighestTid"). In embodiments, the removing code 830 may be configured to cause the at least one processor to remove pictures from the decoded picture buffer based on identifiers (e.g. marking such as "unused for reference" or "no reference").

The decoding code 840 may be configured to cause the at least one processor to decode the current picture using the decoded picture buffer in accordance with one or more of the techniques described above. For example, in an embodiment, the decoding code 840 includes predicting code configured to cause the at least one processor to predict the current picture using one or more of the at least one sub-layer reference picture that is stored within the decoded picture buffer, after removing pictures from the decoded picture buffer (e.g. SLNR pictures or pictures marked with an identifier such as "unused for reference" or "no reference").

In an embodiments, the computer program code may further comprise providing code 850 and forming code 860.

The providing code 850 may be configured to cause the at least one processor to provide identifiers in accordance with one or more of the techniques described above. Identifiers may indicate, for example, that a specified picture is "unused for reference", "used for short-term reference", or "used for long-term reference". For example, the providing code 850 may be configured to cause the at least one processor to provide an identifier (e.g. marking such as "unused for reference" or "no reference") for a picture determined to be an SLNR picture, based on the picture being determined to be an SLNR picture. Alternatively or additionally, the providing code 850 may be configured to cause the at least one processor to provide the identifier in an entry of a reference picture list that corresponds to the picture determined to be the SLNR picture. Alternatively or additionally, the providing code 850 may be configured to cause the at least one processor to provide an identifier for a picture(s), based on determining that the value of the temporal sub-layer of the picture(s) is greater than the predetermined value (e.g. value of "HighestTid"). Alternatively or additionally, the providing code 850 may be configured to cause the at least one processor to set an identifier for each reference picture presently stored in the DPB, indicating that each reference picture presently stored is to be removed from the DPB in a case that the current picture is determined to be an IRAP picture and a flag is determined to indicate that there is no output of a RASL picture.

The forming code 860 may be configured to cause the at least one processor to form one or more reference picture lists in accordance with one or more of the techniques described above. For example, the forming code 860 may be configured to cause the at least one processor to form a reference picture list including an entry for one or more pictures in the DPB.

The techniques, described above, can be implemented as computer software using computer-readable instructions and physically stored in one or more computer-readable media. For example, FIG. 8 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoded picture buffer management, the method comprising:
    storing previously decoded pictures of a video stream in a picture buffer, including a first plurality of pictures of a same temporal sub-layer, the first plurality of pictures including at least one sub-layer reference picture for predicting a current picture of the video stream;
    determining whether a picture of the first plurality of pictures is a non-reference picture based on an indicator presented in at least one from among a slice header and a picture header;
    removing, based on the picture being determined as the non-reference picture, the non-reference picture from the picture buffer; and
    predicting the current picture using one or more of the at least one sub-layer reference picture that is stored within the picture buffer after removing the non-reference picture from the picture buffer.

2. The method of claim 1, wherein the method further comprises:
    determining, for the same temporal sub-layer, a max size of the picture buffer based on a value of sps_max_sub_layers_minus1 attribute,
    wherein the sps_max_sub_layers_minus1 attribute is signaled in a sequence parameter set (SPS); and
    wherein the determining whether the picture of the first plurality of pictures is the non-reference picture comprises:

identifying a network abstract layer (NAL) unit type of the picture; and determining whether the picture is the non-reference picture based on the NAL unit type identified.

3. The method of claim 1, further comprising:

providing an identifier for the picture determined to be the non-reference picture, based on the picture being determined to be the non-reference picture, wherein the removing comprises removing the picture from the picture buffer based on the identifier.

4. The method of claim 3, further comprising:

forming a reference picture list including an entry for each of the first plurality of pictures, wherein the providing the identifier comprises providing the identifier in the entry of the reference picture list that corresponds to the picture determined to be the non-reference picture.

5. The method of claim 1, wherein the previously decoded pictures stored in the picture buffer includes a second picture that is a reference picture, and the method further comprises:

determining whether a value of a temporal sub-layer of the second picture is greater than a predetermined value;

removing the second picture from the picture buffer based on determining that the value of the temporal sub-layer of the second picture is greater than the predetermined value.

6. The method of claim 5, further comprising:

providing an identifier for the second picture, based on determining that the value of the temporal sub-layer of the second picture is greater than the predetermined value, wherein the removing the second picture comprises removing the second picture from the picture buffer based on the identifier.

7. The method of claim 6, further comprising:

comparing the predetermined value to a value corresponding to a highest temporal sub-layer identification number, wherein the determining whether the value of the temporal sub-layer of the second picture is greater than the predetermined value occurs based on the predetermined value being determined to not equal the value corresponding to the highest temporal sub-layer identification number.

8. The method of claim 5, wherein the value of the temporal sub-layer of the second picture is greater than a value of the same temporal sub-layer of the first plurality of pictures that are stored in the picture buffer.

9. The method of claim 5, further comprising:

removing pictures from the picture buffer that are not referred to by a reference picture list, based on the pictures not being referred to by the reference picture list.

10. An encoder for encoding a video stream, the encoder comprising:

memory configured to store computer program code; and at least one processor configured to access the computer program code, and operate as instructed by the computer program code, the computer program code including:

first determining code configured to cause the at least one processor to determine whether picture among a plurality of pictures of a same temporal sub-layer, the first plurality of pictures including at least one sub-layer reference picture for predicting a current picture of the video stream;

first signaling code configured to cause the at least one processor to signal that the picture of the first plurality of pictures is a non-reference picture based on an indicator presented in at least one from among a slice header and a picture header;

removing code configured to cause the at least one processor to remove, based on the picture being determined as the non-reference picture, the non-reference picture from the picture buffer; and signaling code configured to cause the at least one processor to stream the current picture using one or more of the at least one sub-layer reference picture that is stored within the picture buffer after removing the non-reference picture from the picture buffer.

11. The encoder of claim 10, wherein the method further comprises:

second signaling code configured to cause the at least one processor to signal, for the same temporal sub-layer, a max size of a picture buffer as a value of sps_max_sub_layers_minus1 attribute;

wherein the sps_max_sub_layers_minus1 attribute is signaled in a sequence parameter set (SPS): and wherein the first signaling code is configured to cause the at least one processor to identify a network abstract layer (NAL) unit type of the picture, and determine whether the picture is the non-reference picture based on the NAL unit type identified.

12. The encoder of claim 10, wherein the computer program code further includes providing code configured to cause the at least one processor to provide an identifier for the picture determined to be the non-reference picture, based on the picture being determined to be the non-reference picture, and wherein the identifier is used to remove the picture from the picture buffer based on the identifier.

13. The encoder of claim 12, wherein the computer program code further includes forming code configured to cause the at least one processor to form a reference picture list including an entry for each of the first plurality of pictures, and the providing code is configured to cause the at least one processor to providing the identifier in the entry of the reference picture list that corresponds to the picture determined to be the non-reference picture.

14. The encoder of claim 12, wherein the video stream includes a second picture that is a reference picture, and wherein the computer program code further comprises:

second determining code configured to cause the at least one processor to determine whether a value of the temporal sub-layer of the second picture is greater than a predetermined value, wherein determining that the value of a temporal sub-layer of the second picture is greater than the predetermined value is used to remove the second picture from the picture buffer.

15. The encoder of claim 14, wherein the providing code is further configured to cause the at least one processor to provide an identifier for the second picture, based on determining that the value of the temporal sub-layer of the second picture is greater than the predetermined value, and wherein the second picture is removed from the picture buffer based on the identifier.

16. The encoder of claim 15, wherein
program code further comprises:
comparing code configured to cause the at least one processor to compare the predetermined value to a value corresponding to a highest temporal sub-layer identification number, and
third determining code configured to cause the at least one processor to determine whether the value of the temporal sub-layer of the second picture is greater than the predetermined value based on the predetermined value being determined to not be equal to the value corresponding to the highest temporal sub-layer identification number.

17. The encoder of claim 14, wherein
the value of the temporal sub-layer of the second picture is greater than a value of the same temporal sub-layer of the first plurality of pictures that are stored in the picture buffer.

18. A non-transitory computer-readable medium storing computer instructions that, when executed by at least one processor, cause the at least one processor to:
store previously decoded pictures of a video stream in a picture buffer, including a plurality of first pictures of a same temporal sub-layer; and
perform a conversion between a visual media file and a bitstream of a visual media data according to a format rule, wherein the bitstream comprises:
an encoded representation of a picture, the picture being one of the plurality of first pictures and an indicator presented in at least one from among a slice header and a picture header that indicates whether the picture of the first plurality of pictures is a non-reference picture;
remove, based on the picture being determined as the non-reference picture, the non-reference picture from the picture buffer; and
predicting the current picture using one or more of the at least one sub-layer reference picture that is stored within the picture buffer after removing the non-reference picture from the picture buffer.

19. The non-transitory computer-readable medium of claim 18, wherein the computer instructions, when executed by at least one processor, further cause the at least one processor to:
determine, for the same temporal sub-layer, a max size of the picture buffer based on a value of sps_max_sub_layers_minus1 attribute,
wherein the sps_max_sub_layers_minus1 attribute is signaled in a sequence parameter set SPS); and
wherein determining whether the picture is the non-reference picture comprises:
identifying a NAL unit type of the picture; and
determining whether the picture is the non-reference picture based on the NAL unit type having a first value.

\* \* \* \* \*